(12) United States Patent
Radi et al.

(10) Patent No.: US 11,656,992 B2
(45) Date of Patent: May 23, 2023

(54) DISTRIBUTED CACHE WITH IN-NETWORK PREFETCH

(71) Applicant: Western Digital Technologies, Inc., San Jose, CA (US)

(72) Inventors: Marjan Radi, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 44 days.

(21) Appl. No.: 16/548,116

(22) Filed: Aug. 22, 2019

(65) Prior Publication Data

US 2020/0349080 A1 Nov. 5, 2020

Related U.S. Application Data

(60) Provisional application No. 62/842,959, filed on May 3, 2019.

(51) Int. Cl.
| | |
|---|---|
| *G06F 12/00* | (2006.01) |
| *G06F 12/0862* | (2016.01) |
| *G06F 12/0806* | (2016.01) |
| *G06F 12/0802* | (2016.01) |
| *H04L 67/1097* | (2022.01) |
| *G06F 12/0817* | (2016.01) |
| *H04L 67/568* | (2022.01) |

(Continued)

(52) U.S. Cl.
CPC ...... *G06F 12/0862* (2013.01); *G06F 12/0802* (2013.01); *G06F 12/082* (2013.01); *G06F 12/0806* (2013.01); *G06F 12/0817* (2013.01); *G06F 12/0822* (2013.01); *G06F 12/0828* (2013.01); *H04L 67/1097* (2013.01); *H04L 67/568* (2022.05); *G06F 9/34* (2013.01); *G06F 9/3824* (2013.01); *G06F 2212/154* (2013.01); *G06F 2212/602* (2013.01)

(58) Field of Classification Search
CPC ............ G06F 12/0862; G06F 12/0802; G06F 12/0806
USPC ........................................................ 711/119
See application file for complete search history.

(56) References Cited

U.S. PATENT DOCUMENTS

| | | |
|---|---|---|
| 6,044,438 A | 3/2000 | Olnowich |
| 6,078,997 A | 6/2000 | Young et al. |
| 6,108,737 A | 8/2000 | Sharma et al. |

(Continued)

FOREIGN PATENT DOCUMENTS

KR 102163279 B1 10/2020

OTHER PUBLICATIONS

Botelho et al.; "On the Design of Practical Fault-Tolerant SDN Controllers"; Sep. 2014; 6 pages; available at http://www.di.fc.ul.pt/~bessani/publications/ewsdn14-ftcontroller.pdf.

(Continued)

*Primary Examiner* — Mohamed M Gebril
(74) *Attorney, Agent, or Firm* — Barry IP Law, P.C.

(57) ABSTRACT

A programmable switch receives a cache line request from a client of a plurality of clients on a network to obtain a cache line. One or more additional cache lines are identified based on the received cache line request and prefetch information. The cache line and the one or more additional cache lines are requested from one or more memory devices on the network. The requested cache line and the one or more additional cache lines are received from the one or more memory devices, and are sent to the client.

26 Claims, 8 Drawing Sheets

(51) Int. Cl.
G06F 9/38 (2018.01)
G06F 9/34 (2018.01)

(56) References Cited

U.S. PATENT DOCUMENTS

| | | | |
|---|---|---|---|
| 6,209,065 | B1 | 3/2001 | Doren et al. |
| 6,230,243 | B1 | 5/2001 | Elko et al. |
| 6,263,404 | B1 | 7/2001 | Borkenhagen et al. |
| 6,298,418 | B1 | 10/2001 | Fujiwara et al. |
| 6,343,346 | B1 | 1/2002 | Olnowich |
| 6,775,804 | B1 | 8/2004 | Dawson |
| 6,829,683 | B1 | 12/2004 | Kuskin |
| 6,868,439 | B2* | 3/2005 | Basu ............... G06F 16/9574 |
| | | | 709/216 |
| 6,954,844 | B2 | 10/2005 | Lentz et al. |
| 6,993,630 | B1 | 1/2006 | Williams et al. |
| 7,032,078 | B2 | 4/2006 | Cypher et al. |
| 7,376,799 | B2 | 5/2008 | Veazey et al. |
| 7,673,090 | B2 | 3/2010 | Kaushik et al. |
| 7,716,425 | B1 | 5/2010 | Uysal et al. |
| 7,975,025 | B1 | 7/2011 | Szabo et al. |
| 8,166,251 | B2 | 4/2012 | Luttrell |
| 8,281,075 | B2 | 10/2012 | Arimilli et al. |
| 9,088,592 | B1* | 7/2015 | Craft ................... H04L 67/1097 |
| 9,313,604 | B2 | 4/2016 | Holcombe |
| 9,442,850 | B1 | 9/2016 | Rangarajan et al. |
| 9,467,380 | B2 | 10/2016 | Hong et al. |
| 9,819,739 | B2 | 11/2017 | Hussain et al. |
| 9,825,862 | B2 | 11/2017 | Bosshart |
| 9,826,071 | B2 | 11/2017 | Bosshart |
| 9,880,768 | B2 | 1/2018 | Bosshart |
| 9,910,615 | B2 | 3/2018 | Bosshart |
| 9,912,610 | B2 | 3/2018 | Bosshart et al. |
| 9,923,816 | B2 | 3/2018 | Kim et al. |
| 9,936,024 | B2 | 4/2018 | Malwankar et al. |
| 9,940,056 | B2 | 4/2018 | Bosshart |
| 10,038,624 | B1 | 7/2018 | Cruz et al. |
| 10,044,583 | B2 | 8/2018 | Kim et al. |
| 10,050,854 | B1 | 8/2018 | Licking et al. |
| 10,063,407 | B1 | 8/2018 | Kodeboyina et al. |
| 10,063,479 | B2 | 8/2018 | Kim et al. |
| 10,063,638 | B2 | 8/2018 | Huang |
| 10,067,967 | B1 | 9/2018 | Bosshart |
| 10,075,567 | B1 | 9/2018 | Licking et al. |
| 10,078,463 | B1 | 9/2018 | Bosshart |
| 10,084,687 | B1 | 9/2018 | Sharif et al. |
| 10,110,454 | B2 | 10/2018 | Kim et al. |
| 10,127,983 | B1 | 11/2018 | Peterson et al. |
| 10,133,499 | B2 | 11/2018 | Bosshart |
| 10,146,527 | B2 | 12/2018 | Olarig et al. |
| 10,158,573 | B1 | 12/2018 | Lee et al. |
| 10,164,829 | B1 | 12/2018 | Watson et al. |
| 10,169,108 | B2 | 1/2019 | Gou et al. |
| 10,225,381 | B1 | 3/2019 | Bosshart |
| 10,230,810 | B1 | 3/2019 | Bhide et al. |
| 10,237,206 | B1 | 3/2019 | Agrawal et al. |
| 10,257,122 | B1 | 4/2019 | Li et al. |
| 10,268,634 | B1 | 4/2019 | Bosshart et al. |
| 10,298,456 | B1 | 5/2019 | Chang |
| 10,496,566 | B2 | 12/2019 | Olarig et al. |
| 10,628,353 | B2 | 4/2020 | Prabhakar et al. |
| 10,635,316 | B2 | 4/2020 | Singh et al. |
| 10,761,995 | B2 | 9/2020 | Blaner et al. |
| 10,812,388 | B2 | 10/2020 | Thubert et al. |
| 10,880,204 | B1 | 12/2020 | Shalev et al. |
| 2003/0009637 | A1 | 1/2003 | Arimilli et al. |
| 2003/0028819 | A1 | 2/2003 | Chiu et al. |
| 2003/0158999 | A1 | 8/2003 | Hauck et al. |
| 2004/0044850 | A1 | 3/2004 | George et al. |
| 2004/0073699 | A1 | 4/2004 | Hong et al. |
| 2004/0260883 | A1* | 12/2004 | Wallin ............... G06F 12/0862 |
| | | | 711/137 |
| 2005/0058149 | A1 | 3/2005 | Howe |
| 2006/0265568 | A1 | 11/2006 | Burton |
| 2007/0067382 | A1* | 3/2007 | Sun ................... G06F 12/0862 |
| | | | 711/E12.057 |
| 2008/0010409 | A1* | 1/2008 | Rao .................. H04L 67/568 |
| | | | 711/118 |
| 2009/0087341 | A1 | 4/2009 | Cai |
| 2009/0240664 | A1 | 9/2009 | Dinker et al. |
| 2009/0240869 | A1 | 9/2009 | O'Krafka et al. |
| 2009/0313503 | A1* | 12/2009 | Atluri ................. G06F 11/1464 |
| | | | 714/E11.023 |
| 2010/0008260 | A1 | 1/2010 | Kim et al. |
| 2010/0223322 | A1 | 9/2010 | Mott et al. |
| 2011/0004729 | A1 | 1/2011 | Akkawi et al. |
| 2011/0093925 | A1 | 4/2011 | Krishnamoorthy et al. |
| 2011/0238923 | A1* | 9/2011 | Hooker ............... G06F 12/0862 |
| | | | 711/E12.004 |
| 2012/0110108 | A1 | 5/2012 | Li et al. |
| 2012/0155264 | A1 | 6/2012 | Sharma et al. |
| 2013/0254325 | A1 | 9/2013 | Song et al. |
| 2013/0263249 | A1 | 10/2013 | Song et al. |
| 2014/0219284 | A1 | 8/2014 | Chau et al. |
| 2014/0269413 | A1 | 9/2014 | Hui et al. |
| 2014/0269716 | A1* | 9/2014 | Pruss ..................... H04L 45/74 |
| | | | 370/392 |
| 2014/0278575 | A1 | 9/2014 | Anton et al. |
| 2014/0362709 | A1 | 12/2014 | Kashyap et al. |
| 2015/0195216 | A1 | 7/2015 | Di Pietro et al. |
| 2015/0301949 | A1 | 10/2015 | Koka et al. |
| 2015/0319243 | A1 | 11/2015 | Hussain et al. |
| 2015/0378919 | A1* | 12/2015 | Anantaraman ..... G06F 12/0897 |
| | | | 711/122 |
| 2016/0099872 | A1 | 4/2016 | Kim et al. |
| 2016/0127492 | A1 | 5/2016 | Malwankar et al. |
| 2016/0156558 | A1 | 6/2016 | Hong et al. |
| 2016/0216913 | A1 | 7/2016 | Bosshart |
| 2016/0246507 | A1 | 8/2016 | Bosshart |
| 2016/0246535 | A1 | 8/2016 | Bosshart |
| 2016/0294451 | A1 | 10/2016 | Jung et al. |
| 2016/0315964 | A1 | 10/2016 | Shetty et al. |
| 2016/0323189 | A1 | 11/2016 | Ahn et al. |
| 2017/0026292 | A1 | 1/2017 | Smith et al. |
| 2017/0054618 | A1 | 2/2017 | Kim |
| 2017/0054619 | A1 | 2/2017 | Kim |
| 2017/0063690 | A1 | 3/2017 | Bosshart |
| 2017/0064047 | A1 | 3/2017 | Bosshart |
| 2017/0093707 | A1 | 3/2017 | Kim et al. |
| 2017/0093986 | A1 | 3/2017 | Kim et al. |
| 2017/0093987 | A1 | 3/2017 | Kaushalram et al. |
| 2017/0187846 | A1 | 6/2017 | Shalev et al. |
| 2017/0214599 | A1 | 7/2017 | Seo et al. |
| 2017/0286363 | A1 | 10/2017 | Joshua et al. |
| 2017/0371790 | A1* | 12/2017 | Dwiel ................. G06F 12/0862 |
| 2018/0034740 | A1 | 2/2018 | Beliveau et al. |
| 2018/0060136 | A1 | 3/2018 | Herdrich et al. |
| 2018/0173448 | A1 | 6/2018 | Bosshart |
| 2018/0176324 | A1 | 6/2018 | Kumar et al. |
| 2018/0234340 | A1 | 8/2018 | Kim et al. |
| 2018/0234355 | A1 | 8/2018 | Kim et al. |
| 2018/0239551 | A1 | 8/2018 | Bosshart |
| 2018/0242191 | A1 | 8/2018 | Lundqvist et al. |
| 2018/0260330 | A1 | 9/2018 | Felter et al. |
| 2018/0262459 | A1 | 9/2018 | Wang .................... H04L 61/103 |
| 2018/0285275 | A1 | 10/2018 | Barczak et al. |
| 2018/0329818 | A1* | 11/2018 | Cheng ................. G06F 11/1438 |
| 2018/0335953 | A1 | 11/2018 | Ramaswamy et al. |
| 2018/0337860 | A1 | 11/2018 | Kim et al. |
| 2018/0349163 | A1* | 12/2018 | Gao ...................... H04L 49/208 |
| 2018/0349285 | A1 | 12/2018 | Ish et al. |
| 2019/0012278 | A1 | 1/2019 | Sindhu et al. |
| 2019/0044878 | A1 | 2/2019 | Steffen et al. |
| 2019/0050333 | A1 | 2/2019 | Chacon et al. |
| 2019/0058646 | A1 | 2/2019 | Kim et al. |
| 2019/0196987 | A1* | 6/2019 | Shen .................... G06F 13/1642 |
| 2019/0220429 | A1 | 7/2019 | Ranjan et al. |
| 2019/0227921 | A1 | 7/2019 | Frolikov |
| 2019/0342785 | A1 | 11/2019 | Li et al. |
| 2019/0354402 | A1 | 11/2019 | Bivens et al. |
| 2019/0370176 | A1* | 12/2019 | Priyadarshi ......... G06F 12/0893 |
| 2019/0394261 | A1 | 12/2019 | DeCusatis et al. |
| 2020/0007408 | A1 | 1/2020 | Siddappa |
| 2020/0065269 | A1 | 2/2020 | Balasubramani et al. |
| 2020/0068014 | A1 | 2/2020 | Sarkar et al. |

(56) References Cited

U.S. PATENT DOCUMENTS

| | | | |
|---|---|---|---|
| 2020/0089619 A1 | 3/2020 | Hsu et al. | |
| 2020/0097212 A1 | 3/2020 | Lakshman et al. | |
| 2020/0151104 A1 | 5/2020 | Yang | |
| 2020/0213156 A1 | 7/2020 | Cheng et al. | |
| 2020/0226068 A1 | 7/2020 | Gellerich et al. | |
| 2020/0250099 A1 | 8/2020 | Campbell et al. | |
| 2020/0293499 A1 | 9/2020 | Kohli et al. | |
| 2020/0313999 A1 | 10/2020 | Lee et al. | |
| 2020/0349080 A1* | 11/2020 | Radi | H04L 67/568 |
| 2020/0379668 A1 | 12/2020 | Akaike et al. | |
| 2021/0034250 A1 | 2/2021 | Mizuno et al. | |
| 2021/0034270 A1 | 2/2021 | Gupta et al. | |
| 2021/0049078 A1* | 2/2021 | Khan | G06F 3/0652 |
| 2021/0051751 A1 | 2/2021 | Pawar | |
| 2021/0073086 A1 | 3/2021 | Subraya et al. | |
| 2021/0149807 A1 | 5/2021 | Gupta et al. | |
| 2021/0194828 A1 | 6/2021 | He et al. | |
| 2021/0218623 A1 | 7/2021 | Jain et al. | |
| 2021/0247935 A1 | 8/2021 | Beygi et al. | |
| 2021/0294506 A1 | 9/2021 | Tadokoro | |
| 2021/0318828 A1 | 10/2021 | Valtonen | |

OTHER PUBLICATIONS

Huynh Tu Dang; "Consensus Protocols Exploiting Network Programmability"; Mar. 2019; 154 pages; available at: https://doc.rero.ch/record/324312/files/2019INFO003.pdf.

Jialin Li; "Co-Designing Distributed Systems with Programmable Network Hardware"; 2019; 205 pages; available at: https://digital.lib.washington.edu/researchworks/bitstream/handle/1773/44770/Li_washington_0250E_20677.pdf?sequence=1&isAllowed=y.

Liu et al.; "Circuit Switching Under the Radar with REACToR"; Apr. 2-4, 2014; 16 pages; USENIX; available at: https://www.usenix.org/system/files/conference/nsdi14/nsdi14-paper-liu_he.pdf.

Hashemi et al.; "Learning Memory Access Patters"; 15 pages; Mar. 6, 2018; available at https://arxiv.org/pdf/1803.02329.pdf.

Kim, et al.; "A Framework for Data Prefetching using Off-line Training of Markovian Predictors"; Sep. 18, 2002; 8 pages; available at https://www.comp.nus.edu.sg/~wongwf/papers/ICCD2002.pdf.

Cisco White Paper; "Intelligent Buffer Management on Cisco Nexus 9000 Series Switches"; Jun. 6, 2017; 22 pages; available at: https://www.cisco.com/c/en/us/products/collateral/switches/nexus-9000-series-switches/white-paper-c11-738488.html.

Pending U.S. Appl. No. 17/174,681, filed Feb. 12, 2021, entitled "Devices and Methods for Network Message Sequencing", Marjan Radi et al.

Pending U.S. Appl. No. 17/175,449, filed Feb. 12, 2021, entitled "Management of Non-Volatile Memory Express Nodes", Marjan Radi et al.

Leslie Lamport; "Paxos Made Simple"; Nov. 1, 2001; available at: https://lamport.azurewebsites.net/pubs/paxos-simple.pdf.

Paul Krzyzanowski; "Understanding Paxos"; PK.org; Distributed Systems; Nov. 1, 2018; available at: https://www.cs.rutgers.edu/~pxk/417/notes/paxos.html.

Wikipedia; Paxos (computer science); accessed on Jun. 27, 2020; available at: https://en.wikipedia.org/wiki/Paxos_(computer_science).

Pending U.S. Appl. No. 16/916,730, filed Jun. 30, 2020, entitled "Devices and Methods for Failure Detection and Recovery for a Distributed Cache", Radi et al.

Ivan Pepelnjak; Introduction to 802.1Qbb (Priority-based Flow Control-PFC); accessed on Jun. 25, 2020; available at: https://gestaltit.com/syndicated/ivan/introduction-802-1qbb-priority-based-flow-control-pfc/.

Juniper Networks Inc.; Configuring Priority-Based Flow Control for an EX Series Switch (CLI Procedure); Sep. 25, 2019; available at:
https://www.juniper.net/documentation/en_US/junos/topics/task/configuration/cos-priority-flow-control-cli-ex-series.html.

Pending U.S. Appl. No. 16/914,206, filed Jun. 26, 2020, entitled "Devices and Methods for Mianaging Network Traffic for a Distributed Cache", Radi et al.

Written Opinion dated Feb. 20, 2020 from International Application No. PCT/US2019/068360, 4 pages.

International Search Report and Written Opinion dated Apr. 27, 2020 from counterpart International Application No. PCT/US2019/068269, 6 pages.

Eisley et al.; "In-Network Cache Coherence"; 2006; pp. 321-332; Proceedings of the 39th Annual IEEE/ACM International Symposium on Microarchitecture.

Jin et al.; "NetCache: Balancing Key-Value Stores with Fast In-Network Caching"; Oct. 28, 2017; pp. 121-136; Proceedings of the 26th Symposium on Operating Systems Principles.

Li et al.; "Pegasus: Load-Aware Selective Replication with an In-Network Coherence Directory"; Dec. 2018; 15 pages; Technical Report UW-CSE-18-12-01, University of Washington CSE, Seattle, WA.

Liu et al.; "IncBricks: Toward In-Network Computation with an In-Network Cache"; Apr. 2017; pp. 795-809; ACM SIGOPS Operating Systems Review 51, Jul. 26, No. 2.

Pending U.S. Appl. No. 16/697,019, filed Nov. 26, 2019, entitled "Fault Tolerant Data Coherence in Large-Scale Distributed Cache Systems", Marjan Radi et al.

Vestin et al.; "FastReact: In-Network Control and Caching for Industrial Control Networks using Programmable Data Planes"; Aug. 21, 2018; pp. 219-226; IEEE 23rd International Conference on Emerging Technologies and Factory Automation (ETFA). vol. 1.

Ibrar et al.; "PrePass-Flow: A Machine Learning based Technique to Minimize ACL Policy Violation Due to Links Failure in Hybrid SDN"; Nov. 20, 2020; Computer Networks; available at https://doi.org/10.1016/j.comnet.2020.107706.

Saif et al.; "IOscope: A Flexible I/O Tracer for Workloads' I/O Pattern Characterization"; Jan. 25, 2019 International Conference on High Performance Computing; available at https://doi.org/10.1007/978-3-030-02465-9_7.

Zhang et al.; "PreFix Switch Failure Prediction in Datacenter Networks"; Mar. 2018; Proceedings of the ACM on the Measurement and Analysis of Computing Systems; available at: https://doi.org/10.1145/3179405.

Pending U.S. Appl. No. 17/353,781, filed Jun. 21, 2021, entitled "In-Network Failure Indication and Recovery", Marjan Radi et al.

Liu et al.; "DistCache: provable load balancing for large-scale storage systems with distributed caching"; FAST '19 Proceedings of the 17th USENIX Conference on File and Storage Technologies; Feb. 2019; pp. 143-157 (Year 2019).

Radi et al.; "OmniXtend: direct to caches over commodity fabric"; 2019 IEEE Symposium on High-Performance Interconnects (HOTI); Santa Clara, CA; Aug. 2019; pp. 59-62 (Year 2019).

Wang et al.; "Concordia: Distributed Shared Memory with In-Network Cache Coherence"; 19th USENIX Conference on File and Storage Technologies; pp. 277-292; Feb. 2021.

International Search Report and Written Opinion dated Oct. 28, 2021 from International Application No. PCT/US2021/039070, 7 pages.

International Search Report and Written Opinion dated Jun. 1, 2022 from International Application No. PCT/US2022/017608, 7 pages.

Intel Corporation; "In-Band Network Telemetry Detects Network Performance Issues"; White Paper, Dec. 18, 2020; available at: https://builders.intel.com/docs/networkbuilders/in-band-network-telemetry-detects-network-performance-issues.pdf.

International Search Report and Written Opinion dated Jul. 7, 2022 from International Application No. PCT/US2022/017633, 7 pages.

Sabella et al.; "Using eBPF for network traffic analysis"; available at: Year: 2018; https://www.ntop.org/wp-content/uploads/2018/10/Sabella.pdf.

* cited by examiner

DISTRIBUTED CACHE WITH IN-NETWORK PREFETCH

CROSS-REFERENCE TO RELATED APPLICATION

This application claims the benefit of U.S. Provisional Application No. 62/842,959 entitled "DISTRIBUTED BRANCH PREDICTION WITH IN-NETWORK PREFETCH", filed on May 3, 2019, which is hereby incorporated by reference in its entirety.

BACKGROUND

The use of memory access prediction and data prefetch have proven effective in reducing the performance gap between typically faster Central Processing Unit (CPU) processing speeds and slower memory access speeds. Such a performance gap creates a bottleneck in terms of system performance when retrieving cache lines to be loaded into a cache of the CPU (e.g., L1/L2/L3 caches) for processing. Memory access prediction and data prefetch can allow a CPU to predict future memory access needs based on a history of memory access patterns.

Although techniques such as memory access prediction and data prefetch have been used in a single device with a CPU and main memory, such techniques have not been developed for distributed caches where cache lines would be accessed by different processing nodes from one or more memory nodes on a network. Conventional network latencies in transferring data between processing nodes and memory nodes have generally limited the use of such distributed caches.

However, the emergence of high-performance networking (e.g., 100 Gb/s per link and 6.4 Tbit/s aggregate throughput) using Software Defined Networking (SDN) means that the network may no longer be the performance bottleneck in implementing a distributed cache on a network. In this regard, the data transfer latency of conventional fixed-function networking, as opposed to more recent SDN, can be three orders of magnitude greater than typical memory device data access latencies. For example, data transfer latencies with conventional fixed-function networking is typically in terms of hundreds of microseconds, as compared to data access latencies in terms of hundreds of nanoseconds for memory devices such as Dynamic Random Access Memory (DRAM) or Static Random Access Memory (SRAM).

For high-performance networks, the data access latency can be become the greatest contributor to system performance latency. This is especially true where the memory device is a Storage Class Memory (SCM), such as a Magnetic Resistance Random Access Memory (MRAM), a Phase Change Memory (PCM), or a Resistive RAM (RRAM). Recently developed SCMs can provide non-volatile storage of data with a high granularity of access (i.e., byte-addressable or cache line size) and a shorter data access latency, as compared to storage devices, such as a Solid-State Drive (SSD) using flash memory or a Hard Disk Drive (HDD) using a rotating magnetic disk. Although SCM generally consumes less power and costs less for a given storage capacity than DRAM or SRAM, SCM typically has a longer data access latency than DRAM or SRAM. For example, the data access latency of some recently developed SCMs is 4 to 100 times greater than DRAM. As a result, the use of SCM as a memory device for a distributed cache has been limited.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Distributed Cache Examples

Figure 1:
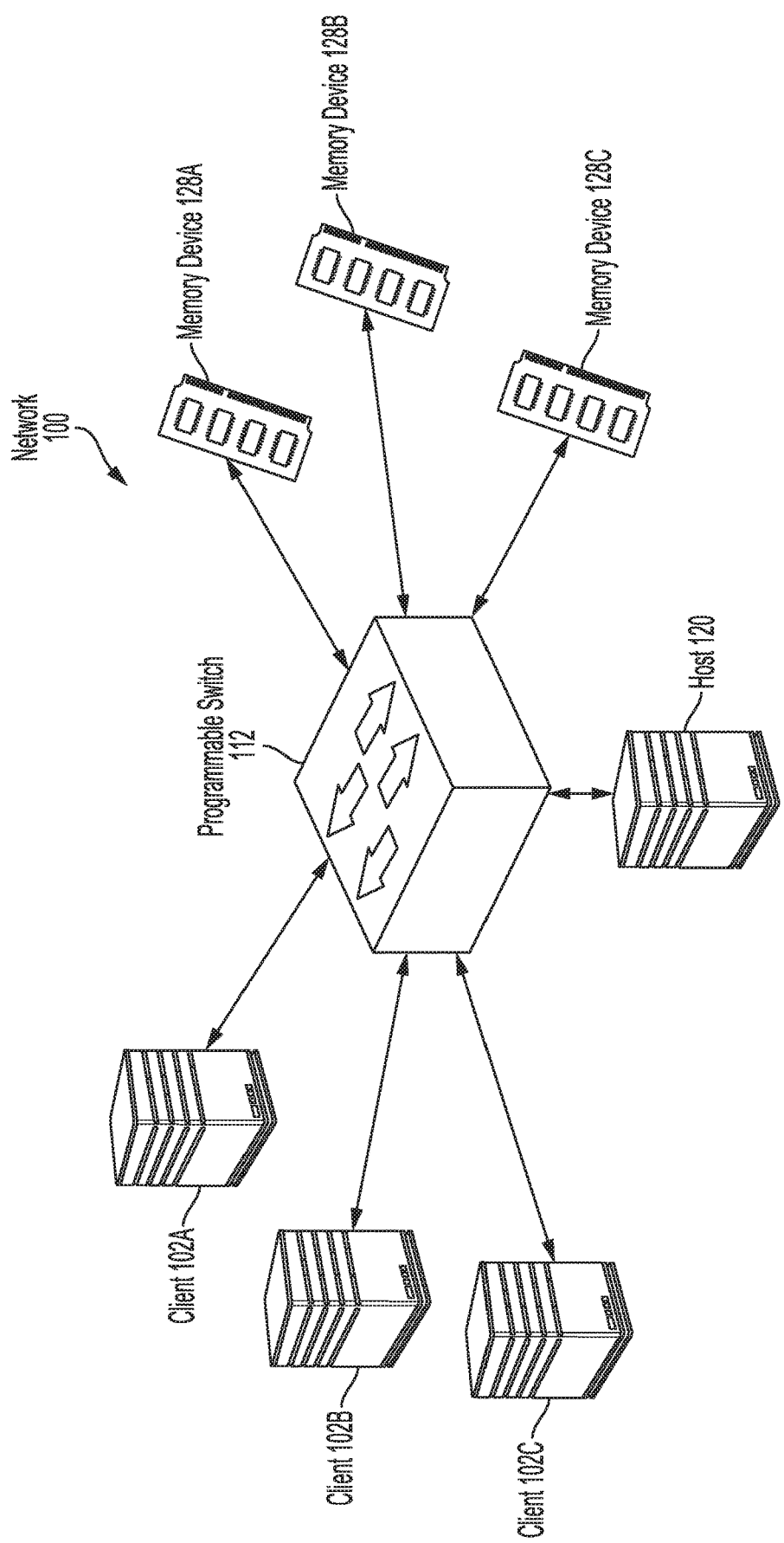
FIG. 1 illustrates an example network including a distributed cache according to one or more embodiments.

FIG. 1 illustrates an example network 100 including a distributed cache according to one or more embodiments. As shown in FIG. 1, network 100 includes clients 102A, 102B, and 102C, data prefetch and memory access predictor host 120, programmable switch 112, and memory devices 128A, 128B, and 128C. Clients 102 can include, for example, servers or processing nodes on network 100, that share memory devices 128 for use as a main memory of the clients. In this regard, data stored in or retrieved from memory devices 128 can include byte-addressable data (i.e., cache lines) to be loaded into a local main memory of a client 102. In some implementations, network 100 may be used as part of a data center or for distributed processing, such as for distributed machine learning or big data analysis.

Programmable switch 112 routes memory messages, such as write requests, read requests, and other communications between clients 102 and memory devices 128. For example, such memory messages may include a read request for a specific memory address or a permission level request for a client to modify a cache line requested from a memory device. Such permission levels can be used to maintain a coherency of data across devices in network 100.

In some implementations, programmable switch 112 can include, for example, a switch that can be programmed to handle different custom protocols. In such implementations, a data plane that controls the point-to-point packet forwarding behavior of programmable switch 112 is programmable and separate from a higher-level control plane that determines end-to-end routes for packets between devices on network 100. As discussed in more detail below with reference to FIG. 4, programmable switch 112 can include programmable match-action stages to provide a configurable data plane and customized packet processing capability. In addition, several programmable switches 112 can form a Software Defined Networking (SDN) that can be programmed to handle different custom protocols.

In one example, programmable switch 112 can be a 64 port Top of Rack (ToR) P4 programmable switch, such as a Barefoot Networks Tofino Application Specific Integrated Circuit (ASIC) with ports configured to provide 40. Gigabit Ethernet (GE) frame rates. Other types of programmable switches that can be used as programmable switch 112 can include, for example, a Cavium Xpliant programmable switch or a Broadcom Trident 3 programmable switch.

The use of a programmable switch allows for the configuration of high-performance and scalable memory centric architectures by defining customized packet formats and processing behavior, such as those discussed below with reference to FIGS. 7 and 8. Programmable switch 112 also allows for a protocol-independent switch architecture and the use of an off-the-shelf switch as opposed to a specially designed Network on a Chip (NoC) for coherence of data across network 100.

Host 120 serves as a data prefetch and memory access prediction host that updates memory prefetch prediction information based on cache miss data received from programmable switch 112. As shown in the example of FIG. 1, host 120 can provide a memory prefetch predictor for a pool of networked devices (i.e., clients 102 and memory devices 128), as opposed to having memory prefetch prediction at each client 102 for data stored at devices across network 100. One or more clients 102 may still execute an internal memory prefetch prediction algorithm for loading locally stored cache lines into an internal main memory of the client from a local storage device in addition to cache lines requested from programmable switch 112.

However, host 120 provides a centralized memory prefetch prediction for accessing data from memory devices 128 on network 100. This centralized arrangement of programmable switch 112 and host 120 can result in a more efficient memory prefetch prediction for prefetching cache lines based on the previous cache line requests for multiple clients (i.e., clients 102A, 102B, and 102C in FIG. 1), as compared to the memory prefetch prediction that may be performed individually by a client. The accumulation of cache miss data from multiple clients can ordinarily provide better memory prefetch predictions due to a larger set of cache line requests for the same data pool. In addition to being able to fully take advantage of cache miss data for multiple clients, the centralized arrangement of programmable switch 112 and host 120 can avoid the duplication of efforts at multiple clients in performing memory prefetch prediction for the distributed cache of network 100.

Memory devices 128 can include, for example, Storage Class Memories (SCMs) or other types of memory, such as Dynamic Random Access Memory (DRAM) or Static RAM (SRAM), that can store and retrieve data at a byte-addressable size or cache line size, as opposed to a page size as in storage devices such as Solid-State Drives (SSDs) or Hard Disk Drives (HDDs). SCMs can include, for example, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), or 3D-XPoint memory. Recently developed SCMs can provide non-volatile storage with a fine granularity of access (i.e., byte-addressable or cache line level) and a shorter data access latency, as compared to storage devices, such as an SSD using flash memory or an HDD using a rotating magnetic disk.

SCM also generally consumes less power, can store more data in a given physical area, and costs less for a given storage capacity than DRAM or SRAM. However, SCM typically has a longer data access latency than DRAM and SRAM. For example, the data access latency of some recently developed SCMs is 4 to 100 times greater than DRAM. As discussed above, the shorter latencies of high-performance networks and processing devices (e.g., CPUs) have shifted the bottleneck in implementing a distributed cache to the memory devices connected on the network.

In one aspect, the programmable switches of the present disclosure can prefetch cache lines from a distributed cache based on memory prefetch prediction to decrease a network-wide data access latency over time to compensate for a greater data access latency of SCMs as compared to DRAM or SRAM. This can allow for less expensive SCM to be used in a distributed cache in place of more expensive DRAM or SRAM. In addition, power usage of the distributed cache is reduced, since such SCMs typically use less power than DRAM or SRAM. Although some or all of memory devices 128 can include an SCM, other implementations of network 100 can include other types of memory devices such as DRAM or SRAM, since the in-network memory access prediction and data prefetch discussed herein can also decrease the overall data transfer latencies of such memories over time.

As will be appreciated by those of ordinary skill in the art, network 100 may include additional devices or a different number of devices than shown in the example of FIG. 1. For example, some implementations may include multiple programmable switches or a different number of clients 102 or memory devices 128.

Figure 2:
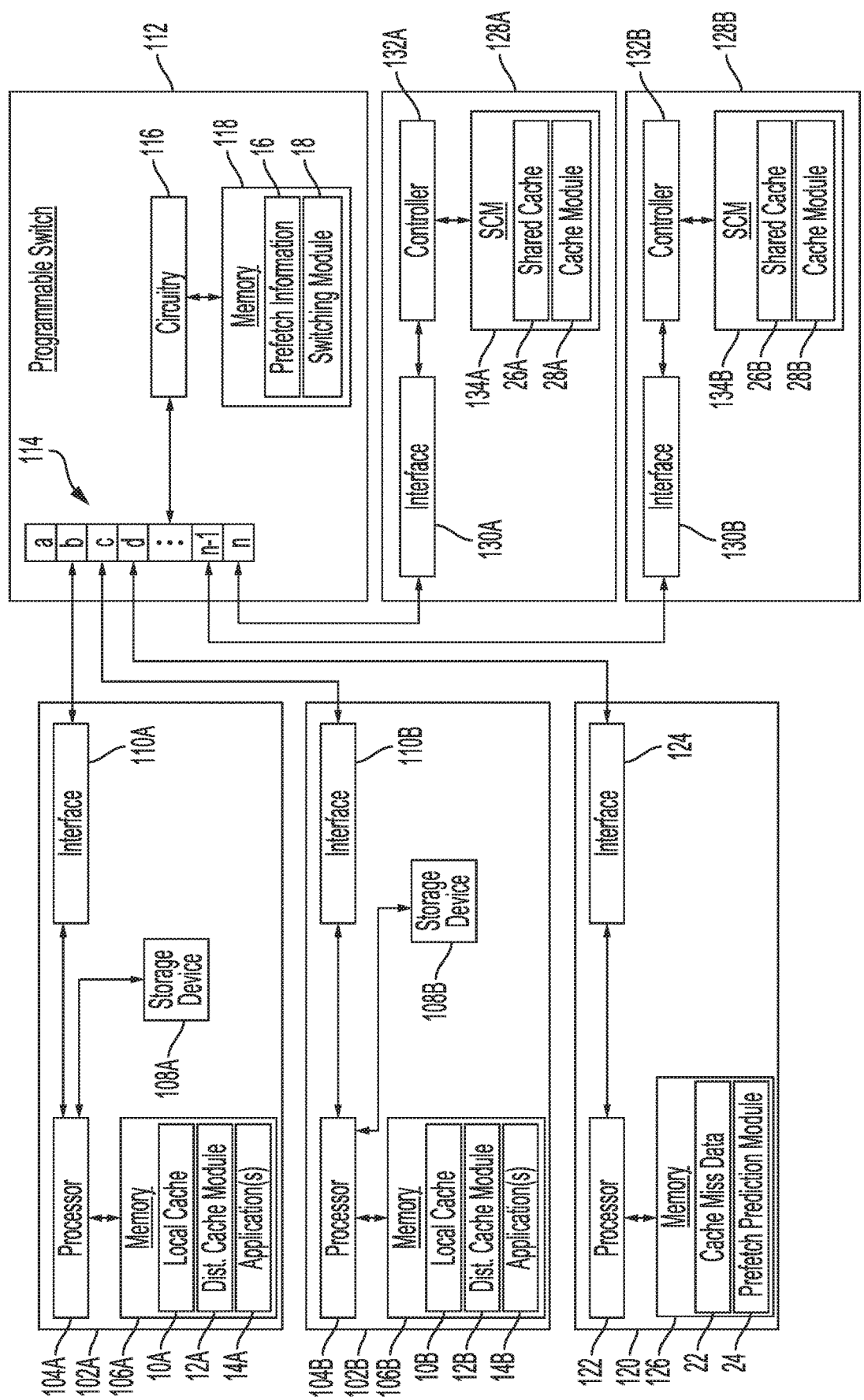
FIG. 2 is a block diagram of example components included in the network of FIG. 1 according to one or more embodiments.

FIG. 2 is a block diagram of example components included in network 100 of FIG. 1 according to one or more embodiments. As shown in FIG. 2, clients 102A and 102B each include a processor 104 (i.e., processors 104A and 104B), a memory 106 (i.e., memories 106A and 106B), a storage device 108 (i.e., storage devices 108A and 108B), and an interface 110 (i.e., interface 110A and 110B) for communicating on network 100. Processors 104A and 104B can execute instructions, such as instructions from distributed cache modules 12A or 12B, and application(s) 14A or 14B, which may include an Operating System (OS) and/or other applications used by client 102A or 102B.

Processors 104 can include circuitry such as a CPU, microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, processors 104 can include a System on a Chip (SoC), which may be combined with one or both of memory 106 and interface 110. Processors 104A and 104B can include one or more cache levels (e.g., L1/L2/L3 cache levels) where data is loaded from or flushed into memories 106A and 106B, respectively, or loaded from or flushed into memory devices 128 via programmable switch 112. Such data can include, for example, portions of code and related data being processed by processor a 104. The data accessed by processors 104A and 104B is referred to herein as cache lines that have a particular cache line size, such as 64 bytes, for example.

Memories 106A and 106B can include, for example, a volatile RAM such as DRAM, a non-volatile RAM, or other solid-state memory that are used by processors 104A and 104B, respectively, as an internal main memory to store data. Data stored in memories 106 can include data read from storage devices 108, data to be stored in storage devices 108, instructions loaded from distributed cache modules 12 or applications 14 for execution by processors 104, and/or data used in executing such applications. In addition to loading data from an internal main memory 106, processors 104 also load data from memory devices 128 as an external main memory or distributed cache. Such data may also be flushed after modification by the processor 104 or evicted without modification back into an internal main memory 106 or an external main memory device 128 via programmable switch 112.

As shown in FIG. 2, memories 106A and 106B store distributed cache modules 12A and 12B, respectively. Distributed cache modules 12 can provide instructions for retrieving, storing, or maintaining coherency of cache lines stored in memory devices 128 on network 100. Such instructions can include a protocol for maintaining coherency of data (e.g., cache lines) stored on different devices of network 100 and handling communications with programmable switch 112. In some implementations, distributed cache modules 12 can include a driver used by an OS of the client.

Storage devices 108A and 108B serve as secondary storage that can include, for example, one or more rotating magnetic disks or non-volatile solid-state memory, such as flash memory. While the description herein refers to solid-state memory generally, it is understood that solid-state memory may comprise one or more of various types of memory devices such as flash integrated circuits, NAND memory (e.g., single-level cell (SLC) memory, multi-level cell (MLC) memory (i.e., two or more levels), or any combination thereof), NOR memory, EEPROM, other discrete Non-Volatile Memory (NVM) chips, or any combination thereof. As noted above internal main memories 106 and external memory devices 128 typically provide faster data access and can provide more granular data access (e.g., cache line size or byte-addressable) than storage devices 108.

Interfaces 110A and 110B are configured to interface clients 102A and 102B, respectively, with devices on network 100, such as programmable switch 112. Interfaces 110 may communicate using a standard such as, for example, Ethernet, Fibre Channel, or InifiniBand. In this regard, clients 102, programmable switch 112, host 120, and memory devices 128 may not be physically co-located and may communicate over a network such as a Local Area Network (LAN) or a Wide Area Network (WAN). As will be appreciated by those of ordinary skill in the art, interface 110A or 110B can be included as part of processor 104A or processor 104B, respectively.

Programmable switch 112 in some implementations can be a ToR switch for a server rack including memory devices 128. In the example of FIG. 2, programmable switch 112 includes ports 114, circuitry 116, and memory 118. Ports 114 provide a connection and are configured to communicate with devices, such as clients 102, host 120, and memory devices 128 on network 100. For example, ports 114 may include Ethernet, Fibre Channel, or InfiniBand ports. Circuitry 116 can include circuitry such an ASIC, a microcontroller, a DSP, an FPGA, hard-wired logic, analog circuitry and/or a combination thereof. In some implementations, circuitry 116 can include an SoC, which may be combined with memory 118.

Memory 118 of programmable switch 112 can include, for example, a volatile RAM such as DRAM, or a non-volatile RAM or other solid-state memory such as register arrays that are used by circuitry 116 to execute instructions loaded from switching module 18 or firmware of programmable switch 112, and/or data used in executing such applications, such as prefetch information 16. In this regard, and as discussed in more detail below, switching module 18 can include instructions for implementing processes such as those discussed with reference to FIGS. 7 and 8 below to expand cache line requests received from clients 102 into additional cache line requests and prefetch cache lines predicted to be used by the client based on prefetch information 16. In the implementation of FIG. 2, host 102 may provide programmable switch 112 with updated prefetch information based on cache miss data provided by programmable switch 112 to host 120. Prefetch information 16 can include, for example, match-action tables that associate requested cache lines with other cache lines predicted to be needed soon after the requested cache line.

In the example of FIG. 2, memory devices 128A and 128B include SCMs 134A and 134B, respectively, that allow cache lines to be retrieved from and stored in shared caches 26A and 26B, respectively, for use by clients 102. As shown in FIG. 2, SCMs 134A and 134B also store cache modules 28A and 28B, which provide instructions for controllers 132 to implement cache coherency processes and a communication protocol for interfacing with programmable switch 112. Controllers 132A and 132B control operation of memory devices 128A and 128B, respectively, and can include circuitry such as a microcontroller, a DSP, an FPGA, an ASIC, hard-wired logic, analog circuitry and/or a combination thereof. In some implementations, controllers 132A and 132B can include an SoC, which may be combined with interfaces 130A and 130B, respectively, and/or SCMs 134A and 134B. Interfaces 130A and 130B are configured to interface with ports of programmable switch 112, and may interface according to a standard, such as Ethernet, Fibre Channel, or InfiniBand.

Host 120 in the example of FIG. 2 receives cache miss data from programmable switch 112 via interface 124 and stores this information as cache miss data 22 in memory 126. As discussed in more detail below with reference to FIGS. 3 and 9, programmable switch 112 in some implementations can mirror cache line requests received from a client 102 to port d, which is used to communicate with host 120. Host 120 may continually or intermittently collect such mirrored cache line requests to form cache miss data 22.

Processor 122 of host 120 executes prefetch prediction module 24 to generate or update prefetch information that is sent to programmable switch 112. As discussed above, prefetch information 16 can be used by programmable switch 112 to determine one or more additional cache lines to request in response to receiving a cache line request from a client 102. In the implementation of FIG. 2, processor 122 of host 102 can execute a memory access prediction algorithm as part of prefetch prediction module 24 to generate prefetch information based on cache miss data 22. As discussed above, prefetch prediction can be used to predict memory access patterns before it is definitely known which memory addresses need to be accessed to perform system operations. The memory access prediction in the present disclosure attempts to improve system performance by predicting whether additional cache lines will soon be needed by the requesting client, and prefetching one or more predicted additional cache lines for the client.

As will be appreciated by those of ordinary skill in the art, other implementations may include a different arrangement or number of components or modules than shown in the example of FIG. 2. For example, in some implementations, programmable switch 112 may update its own prefetch information without receiving updated prefetch information from host 120 such that host 120 is not included in network 100. In yet other implementations, multiple programmable switches may share a single host 120 that is used to update prefetch information for the programmable switches.

Figure 3A:
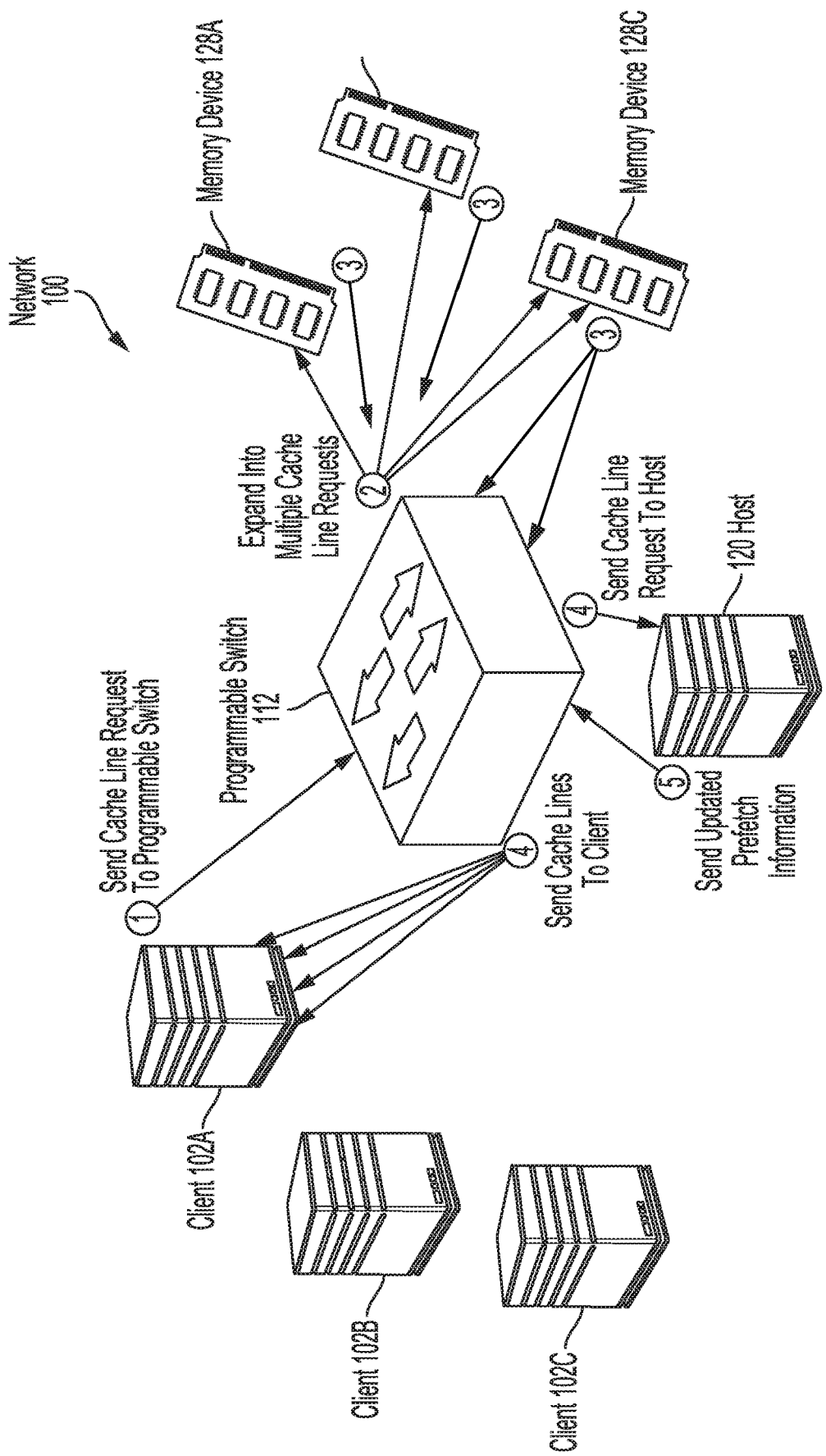
FIG. 3A illustrates an example sequence of operations for implementing a distributed cache in the network of FIG. 1 according to one or more embodiments.
Figure 3B:
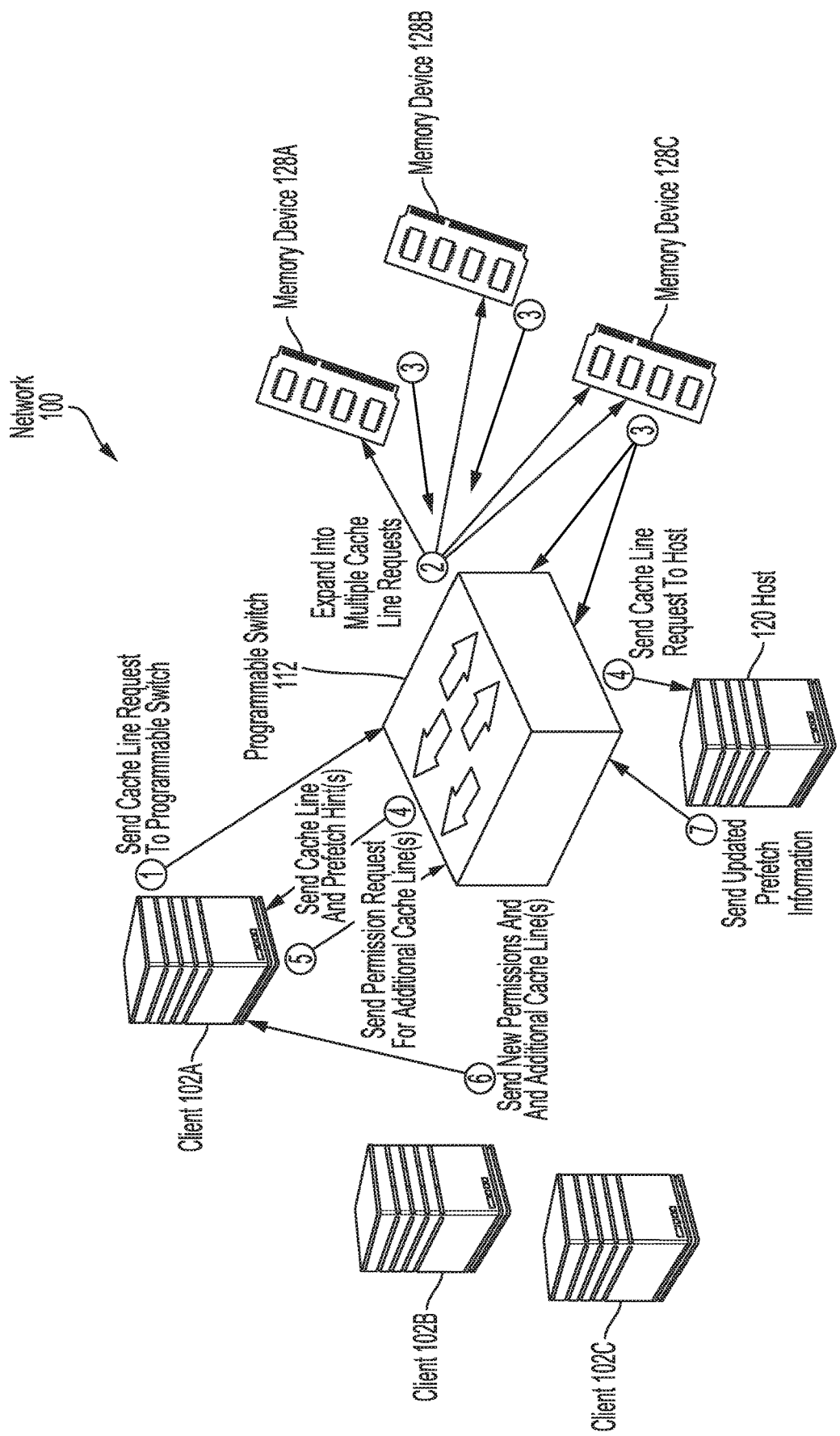
FIG. 3B illustrates a second example sequence of operations for implementing a distributed cache in the network of FIG. 1 according to one or more embodiments.
Figure 3C:
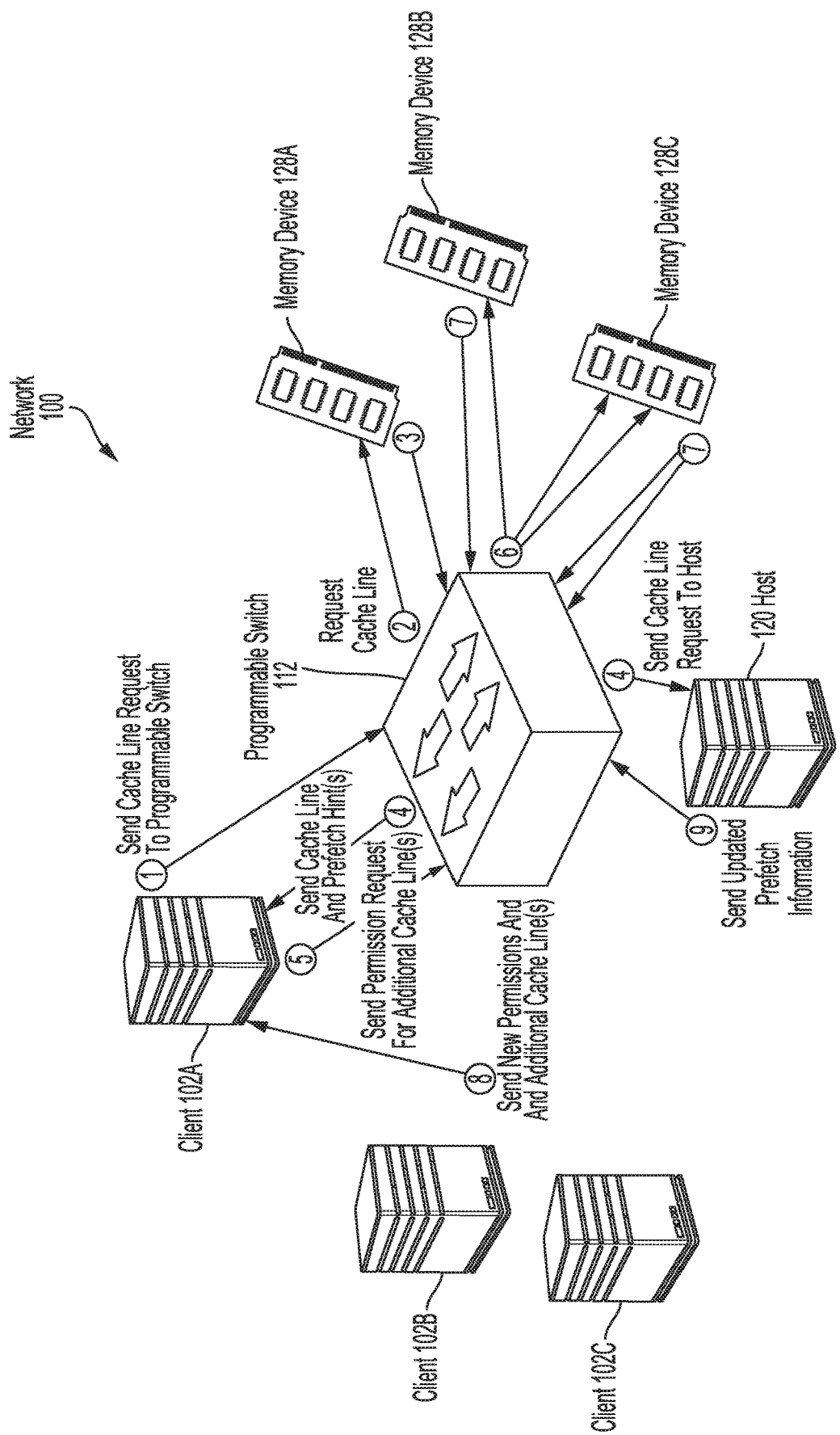
FIG. 3C illustrates a third example sequence of operations for implementing a distributed cache in the network of FIG. 1 according to one or more embodiments.

FIGS. 3A to 3C illustrate example sequences of operation for implementing a distributed cache in the network of FIG. 1 according to one or more embodiments. The numbered circles in FIGS. 3A to 3C indicate an example order of operations. As shown in the example of FIG. 3A, client 102A first sends a cache line request to programmable switch 112. Cache line requests can be sent by a client 102 when there is a cache miss locally at the client. For example, with reference to FIG. 2 discussed above, processor 104A of client 102A may request data to load into its L1/L2 cache as a cache line. If the requested cache line is not already cached in local cache 10A of memory 106A of client 102A, processor 104A using distributed cache module 12A sends the cache line request to port b of programmable switch 112 via interface 110A.

In the example of FIG. 3A, programmable switch 112 expands the cache line request received from client 102A into multiple cache line requests. With reference to the example of FIG. 2, circuitry 116 of programmable switch 112 can use prefetch information 16 stored in memory 118 of programmable switch 112 to identify one or more additional cache lines to obtain based on the cache line request received from client 102A. In some implementations, and as described in more detail below with reference to FIG. 4, circuitry 116 of programmable switch 112 can perform match-actions on the cache line request to identify the one or more additional cache lines. As discussed with reference to the process of FIG. 6, circuitry 116 may calculate one or more offset addresses from a requested address to identify the one or more identified additional cache line requests using prefetch information 16.

In FIG. 3A, the multiple cache line requests are then sent to one or more memory devices 128 where the requested cache lines are stored. With reference to FIG. 2, circuitry 116 of programmable switch 112 may use ports n-1 and n to forward the cache line requests to memory devices 128A and 128B. The memory device or devices 128 access the requested cache lines from shared cache or caches 26, and return the requested cache lines to programmable switch 112 via interface or interfaces 130. The portions of circuitry 116 serving as the data plane of programmable switch 112 then route the returned cache lines through port b to client 102A. Although client 102A only requested one cache line, programmable switch 112 prefetches and returns one or more additional cache lines that are predicted to soon be needed by client 102A based on the requested cache line.

In addition, programmable switch 112 sends the cache line request received from client 102A to host 120. In some implementations, this may be accomplished by mirroring a packet for the cache line request to a port for host 120, such as port d in the example of FIG. 2. Host 120 may then store an indication of the cache line request in memory 126 as cache miss data 22. After a predetermined time period and/or a predetermined number of cache line requests, host 120 can update prefetch information based on more recent cache miss data 22. In updating the prefetch information, processor 122 of host 120 may use, for example, a memory access prediction algorithm. Host 120 sends the updated prefetch information to programmable switch 112, which circuitry 116 of programmable switch 112 can store as a new version of prefetch information 16.

In other implementations, the order of actions taken in the example of FIG. 3A may differ. For example, the cache line request may be sent to host 120 before the cache line request is expanded into multiple cache line requests or before the multiple cache lines are sent to client 102A. In addition, and as discussed in more detail below with reference to the examples of FIGS. 3B and 3C, programmable switch 112 may send prefetch hints to client 102A before sending the additional cache lines to client 102A to indicate which additional cache lines are predicted to be needed by client 102A.

FIG. 3B illustrates a second example sequence of operations for implementing a distributed cache in the network of FIG. 1 according to one or more embodiments where programmable switch 112 sends one or more prefetch hints to client 102A before sending additional cache lines. As in the example of FIG. 3A, client 102A in the example of FIG. 3B sends a cache line request to programmable switch 112, which expands the cache line request into multiple cache line requests. Programmable switch 112 can use prefetch information 16 stored in memory 118 of programmable switch 112 to identify one or more additional cache lines to obtain based on the cache line request received from client 102A.

However, unlike the example of FIG. 3A, programmable switch 112 in the example of FIG. 3B sends the requested cache line back to client 102A with one or more prefetch hints indicating an additional cache line or additional cache lines retrieved from one or more memory devices 128. As with the additional cache lines in the example of FIG. 3A, the additional cache lines in the example of FIG. 3B are predicted to be needed by client 102A soon based on the original cache line request, prefetch information 16, and optionally the client requesting the cache line. In some implementations, the prefetch hints can include one or more memory addresses indicating one or more corresponding additional cache lines.

In FIG. 3B, client 102A sends a permission request for the one or more additional cache lines in response to the prefetch hint or hints. The permission request can include, for example, a requested permission level for accessing the one or more additional cache lines, such as whether the cache line will be used in a read-only mode or a read and write mode, or may otherwise request access to the one or more additional cache lines. In some cases, client 102A may not send a permission request or may indicate that only certain additional cache lines are to be sent. For example, one of the additional cache lines may already be locally stored in a memory of client 102A, such that the additional cache line is not needed from programmable switch 112. For its part, programmable switch 112 locally stores the additional cache lines in a memory of programmable switch 112, such as in memory 118, until receiving a response from client 102A on whether to send the additional cache lines. By storing the additional cache lines locally at programmable switch 112, it is ordinarily possible to provide the additional cache lines to client 102A faster than if the additional cache lines are requested after receiving the permission request from client 102A.

As shown in the example of FIG. 3B, a new permission or permissions are sent from programmable switch 112 with the additional cache line or cache lines in response to receiving the permission request from client 102A. The use of the prefetch hints in the example of FIG. 3B can allow for client 102A to prepare for or expect the additional cache lines before the additional cache lines are received without having the burden of predicting the additional cache lines. In this regard, programmable switch 112 provides centralized memory access prediction and prefetch for multiple clients 102, which can improve the accuracy of the memory access predictions since they are based on a larger set of prefetch information while offloading the processing and prefetching from clients 102.

In addition, programmable switch 112 sends the cache line request received from client 102A to host 120. In some implementations, this may be accomplished by mirroring a packet for the cache line request to a port for host 120, such as port d in the example of FIG. 2. Host 120 may then store an indication of the cache line request in memory 126 as cache miss data 22. After a predetermined time period and/or a predetermined number of cache line requests, host 120 can update prefetch information based on more recent cache miss data 22. Host 120 sends the updated prefetch information to programmable switch 112, which circuitry 116 of programmable switch 112 can store as a new version of prefetch information 16.

FIG. 3C illustrates a third example sequence of operations for implementing a distributed cache in the network of FIG. 1 according to one or more embodiments where programmable switch 112 sends one or more prefetch hints to client 102A before requesting additional cache lines from memory devices 128. As in the examples of FIGS. 3A and 3B, client 102A in the example of FIG. 3C sends a cache line request to programmable switch 112. However, unlike the example of FIG. 3B, programmable switch 112 in the example of FIG. 3C returns the requested cache line to client 102A with one or more prefetch hints before expanding the cache line request into one or more additional cache line requests.

As shown in FIG. 3C, programmable switch 112 requests the cache line requested by client 102A from memory device 128A, and returns the requested cache line and one or more prefetch hints to client 102A. Unlike the example of FIG. 3B, programmable switch 112 in FIG. 3C does not store the additional cache lines in a local memory before receiving the permission request from client 102A for the additional cache lines. Although it may take longer to access the additional cache lines from one or more memory devices 128, programmable switch 112 conserves its local memory by not storing the additional cache lines and may reduce system processing or network traffic by not requesting additional cache lines that may not ultimately be requested by client 102A.

Programmable switch 112 in the example of FIG. 3C sends the requested cache line back to client 102A with one or more prefetch hints indicating a predicted additional cache line or predicted additional cache lines that can be retrieved from one or more memory devices 128. As with the additional cache lines in the examples of FIGS. 3A and 3B, the additional cache lines in the example of FIG. 3C are predicted to be needed by client 102A soon based on the original cache line request, prefetch information 16, and optionally the client requesting the cache line. In some implementations, the prefetch hints can include one or more memory addresses indicating one or more corresponding additional cache lines.

In FIG. 3C, client 102A sends a permission request for the one or more additional cache lines in response to the prefetch hint or hints. The permission request can include, for example, a requested permission level for accessing the one or more additional cache lines, such as whether the cache line will be used in a read-only mode or a read and write mode, or may otherwise request access to the one or more additional cache lines. In some cases, client 102A may not send a permission request or may indicate that only certain additional cache lines are to be sent.

As shown in the example of FIG. 3C, programmable switch 112 sends additional cache line requests to memory devices 128B and 128C in response to the permission request received from client 102A. New permissions are sent from programmable switch 112 with the additional cache lines after receiving the additional cache lines from memory devices 128B and 128C.

In addition, programmable switch 112 sends the cache line request received from client 102A to host 120. In some implementations, this may be accomplished by mirroring a packet for the cache line request to a port for host 120, such as port d in the example of FIG. 2. Host 120 may then store an indication of the cache line request in memory 126 as cache miss data 22. After a predetermined time period and/or a predetermined number of cache line requests, host 120 can update prefetch information based on more recent cache miss data 22. Host 120 sends the updated prefetch information to programmable switch 112, which circuitry 116 of programmable switch 112 can store as a new version of prefetch information 16.

Figure 4:
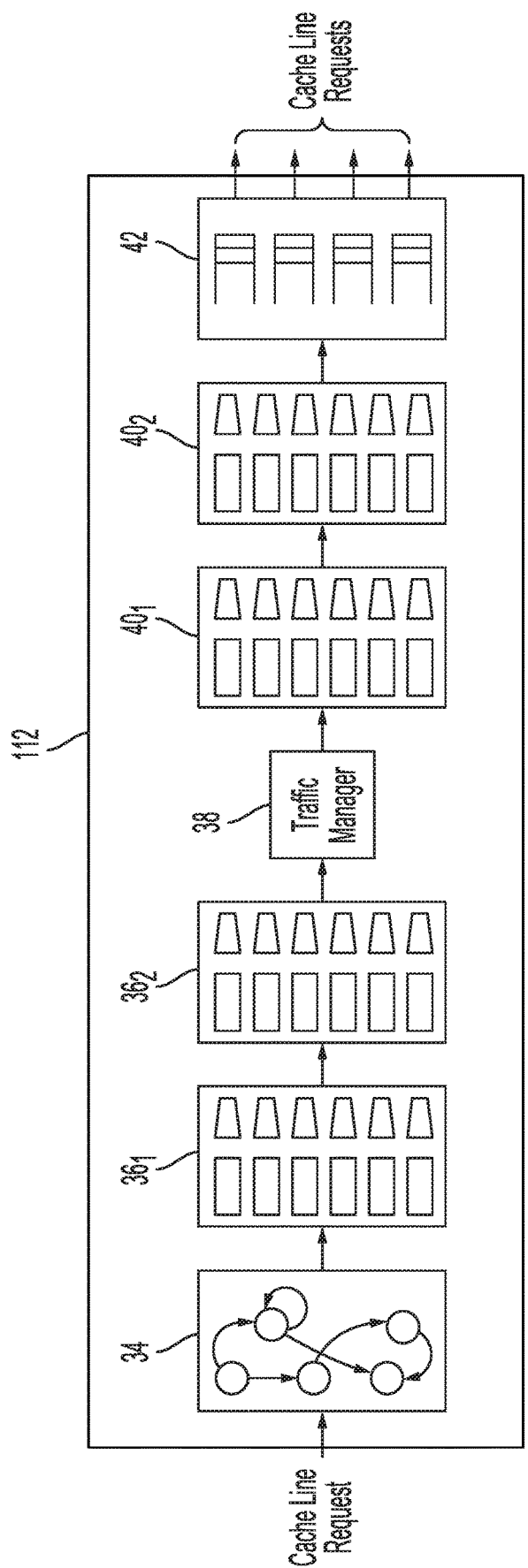
FIG. 4 depicts example modules in a pipeline of a programmable switch according to one or more embodiments.

FIG. 4 depicts example modules in a pipeline of programmable switch 112 according to one or more embodiments. As shown in FIG. 4, the pipeline for programmable switch 112 can include parser 34, ingress stages $36_1$ and $36_2$, traffic manager 38, egress stages $40_1$ and $40_2$, and deparser 42. Each of these modules may be programmed, such as by using P4, to handle a custom packet header and protocol. In addition, the example modules of programmable switch 112 shown in FIG. 4 can be implemented by circuitry 116 and memory 118 in FIG. 2, which is capable of parallel processing of packets in sequential stages.

In the example of FIG. 4, a cache line request is received as a packet by parser module 34 of programmable switch 112. For its part, parser module 34 is configured to extract values from the packet, such as a destination address, operation type, or a source address, from a header in the packet for match-action operations performed by the ingress and egress stages. The extracted header values are fed into the ingress pipeline that includes stages $36_1$ and $36_2$.

As noted above, memory messages can have a custom packet format so that programmable switch 112 can distinguish memory messages, such as messages for cache line addressed data, from other network traffic, such as messages for page addressed data. The indication of a memory message, such as a cache line request, causes circuitry 116 of programmable switch 112 to handle the packet differently from other packets that are not indicated as being a memory message. In some implementations, the custom packet format fits into a standard 802.3 Layer 1 frame format, which can allow the packets to operate with existing and forthcoming programmable switches, such as a Barefoot Tofino ASIC switch, for example. In such an implementation, the preamble, start frame delimiter, and interpacket gap may follow the standard 802.3 Layer 1 frame format, but portions in Layer 2 are replaced with custom header fields that can be parsed by programmable switch 112. A payload of a packet for a memory message can include one or more memory addresses for one or more cache lines being requested by a client or being returned to a client.

Stages $36_1$ and $36_2$ can include, for example programmable Arithmetic Logic Units (ALUs) and one or more memories that store match-action tables as part of prefetch information, such as prefetch information 16 in FIG. 2. In some implementations, the stages of the ingress pipeline and the egress pipeline may share a single memory, such as memory 118 in FIG. 2. The matches are made according to predefined rules and the extracted packet header values.

Traffic manager 38 routes the cache line request to an appropriate port of programmable switch 112. In addition, and as discussed above, traffic manager 38 may mirror the originally received packet for the cache line request to a port for host 120 to provide host 120 with cache miss data. In some implementations, the ingress pipeline calculates offsets for additional cache line prefetches based on the parsed header fields, and then generates corresponding additional packets using a packet generation engine of programmable switch 112. In the example of FIG. 4, the egress pipeline includes stages $40_1$ and $40_2$ that can each include ALUs and memories that can also be used for offset calculations in some implementations. The frames are then assembled in packets by deparser 42 for the multiple cache line requests before leaving programmable switch 112.

As will be appreciated by those of ordinary skill in the art, other implementations may include a different arrangement of modules for a programmable switch. For example, other implementations may include more or less stages as part of the ingress or egress pipeline.

Example Processes

Figure 5:
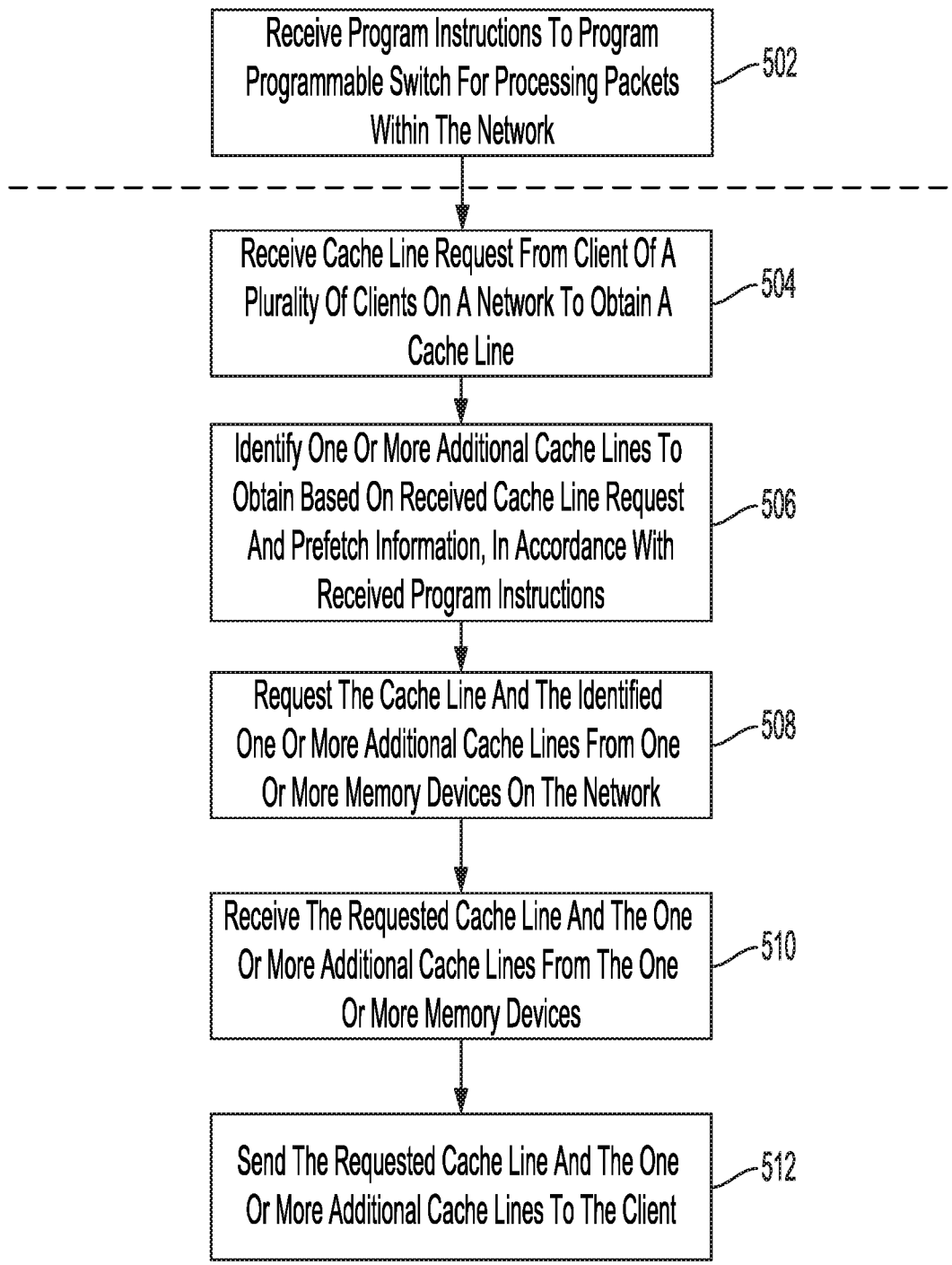
FIG. 5 is a flowchart for a cache line request process according to one or more embodiments.

FIG. 5 is a flowchart for a cache line request process that can be performed by programmable switch 112 according to one or more embodiments. In block 502, programmable switch 112 receives program instructions to program programmable switch 112 for processing packets within the network. As discussed above, programmable switch 112 is programmable in the sense that it can be programmed to handle a customized packet protocol for processing memory messages. In some implementations, the received program instructions can include instructions for match-action stages to provide a configurable data plane. In this regard, programmable switch 112 may be part of an SDN.

The receipt of program instructions or programming in block 502 may occur during a configuration process of programmable switch 112 when programmable switch 112 is offline or not connected to network 100. In other cases, the programming or program instructions may be received while programmable switch 112 is connected to network 100 and may come from a host or other device on network 100, such as from host 120, for example. The dashed line between blocks 502 and 504 in FIG. 5 indicates that there may be a relatively long time between receiving the program instructions in block 502 and receiving a cache line request in block 504.

In block 504, a cache line request is received by programmable switch 112 from a client 102 of a plurality of clients to obtain a cache line. As discussed above, the cache line is a size of data that can be used by a processor of the requesting client that would otherwise be accessed from a local main memory of the client in a conventional system.

In block 506, programmable switch 112 identifies one or more additional cache lines to obtain based on the received cache line request and prefetch information, in accordance with the program instructions received in block 502. In some implementations, a programmable ingress pipeline including one or more stages can perform match-action operations to associate an address for the requested data with one or more additional addresses for the one or more additional cache lines using match-action tables that form prefetch information 16. In more detail, memory addresses for the one or more additional cache lines can be calculated using offsets included in prefetch information 16. As discussed below with reference to the prefetch information update process of FIG. 7, host 120 may provide programmable switch 112 with prefetch information 16 based on a memory access prediction algorithm performed on cache miss data received from programmable switch 112.

In block 508, programmable switch 112 requests the cache line for the received request and the identified one or more additional cache lines. Packets for the cache line requests can be formed by an ingress pipeline and packet generation engine of the programmable switch. A traffic manager of the programmable switch can route the packets to one or more different ports corresponding to one or more memory devices 128 storing the multiple cache lines. The ports can be identified by the traffic manager and control plane based on the memory addresses for the cache lines. In addition, the traffic manager of programmable switch 112 may also mirror the original cache line request to a port for host 120 to provide host 120 with cache miss data.

In block 510, the requested cache line and one or more additional cache lines are received from the one or more memory devices 128. The received cache lines can proceed through the ingress pipeline to determine that the cache lines should be routed back to the client that sent the original cache line request. In block 512, programmable switch 112 sends the requested cache line and the one or more additional cache lines to the requesting client.

Figure 6:
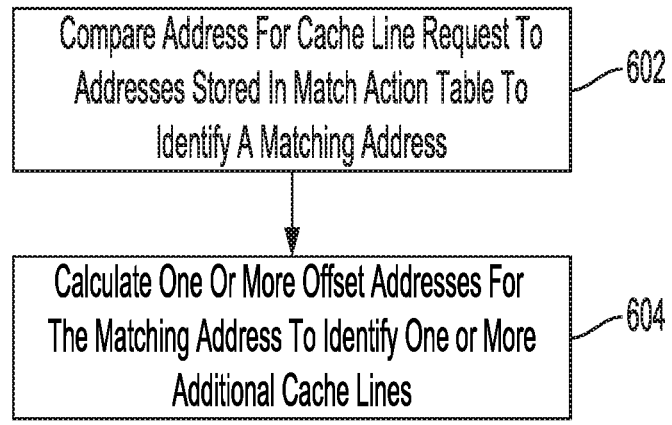
FIG. 6 is a flowchart for an address identification process according to one or more embodiments.

FIG. 6 is a flowchart for an address identification process performed by programmable switch 112 according to one or more embodiments. In some implementations, the process of FIG. 6 can be a sub-process of the identification of one or more additional cache lines discussed above for block 506 in the cache line request process of FIG. 5.

In block 602, programmable switch 112 compares an address for a cache line requested by a cache line request to addresses stored in one or more match-action tables to identify a matching address. The identification can be performed as part of an ingress or egress pipeline of programmable switch 112 where headers or frames of packets can be processed in parallel following a parser to identify an address in the cache line request and compare the address to one or more match-action tables that include addresses and a corresponding instruction or action to be taken upon finding a match.

In block 604, a stage of programmable switch 112 (e.g., stage $36_1$, $36_2$, $40_1$, or $40_2$ in FIG. 4) calculates one or more offset addresses for a matching address to identify one or more additional cache lines. In the implementation of FIG. 6, prefetch information 16 includes match-action tables that include an offset indicating how much to add or subtract from the matching address to identify one or more additional addresses for one or more additional cache lines to obtain. In this regard, the action for some addresses in a match-action table may only include a single offset for one additional address or may include more than one offset for multiple additional addresses. The offsets may indicate a positive or negative value for adding to the matching address or subtracting from the matching address. Addresses that do not have a matching address may not result in any additional addresses or corresponding additional cache lines. In such cases, no additional cache line requests are generated by programmable switch 112.

Other implementations may identify addresses for additional cache lines in a different way. For example, some implementations may include tables that associate the additional addresses themselves with the matching address so that it is not necessary for programable switch 112 to calculate offset addresses as in the example of FIG. 6.

As discussed above, prefetch information 16 can be provided by a separate host 120 that allows for updates to be performed to prefetch information 16 based on cache miss data (e.g., received cache line requests) without interfering with the operation of programmable switch 112.

Figure 7:
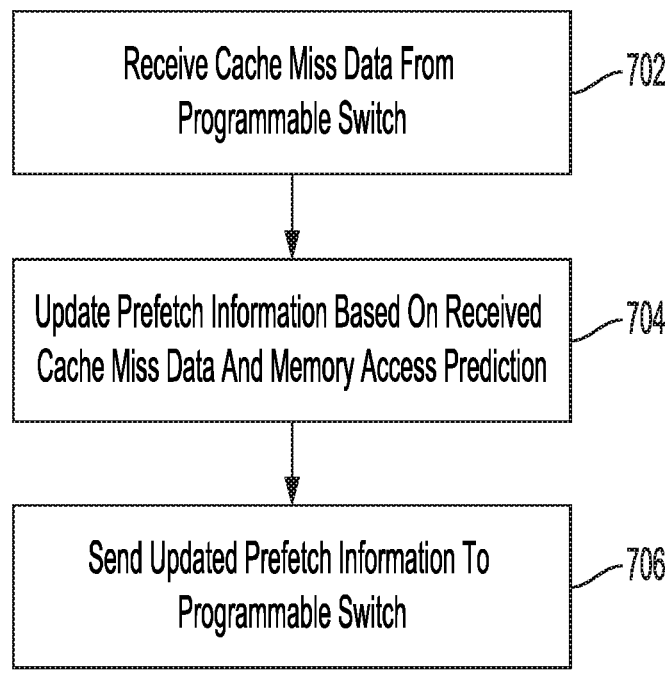
FIG. 7 is a flowchart for a prefetch information update process according to one or more embodiments.

FIG. 7 is a flowchart for a prefetch information update process that can be performed host 120 according to one or more embodiments. In block 702, host 120 receives cache miss data from programmable switch 112. As discussed above, the cache miss data can include, for example, cache line requests that have been mirrored or forwarded by programmable switch 112 to host 120. The received cache miss data can be stored for later use with other cache miss data to update prefetch information. In this regard, host 120 may continuously collect cache miss data or may intermittently collect cache miss data. The collected cache miss data can be stored as cache miss data 22 for use in updating prefetch information.

In block 704, host 120 updates prefetch information for programmable switch 112 or creates new prefetch information based on the cache miss data received in block 902. In the example of FIG. 7, host 120 or processor 122 of host 120 executing prefetch prediction module 24 uses a memory access prediction algorithm to predict additional cache lines that may be needed for particular requested cache lines based on the history of cache lines requested in close temporal proximity to one another by the same client.

In block 706, host 120 sends updated prefetch information to programmable switch 112. In some implementations, the updated prefetch information may only include information for addresses that have changed since a previous version of the prefetch information. In other implementations, host 120 may send updated prefetch information for all of the addresses represented by the cache miss data. The updated prefetch information can include, for example, new match-action tables or portions thereof. As discussed above, the match-action tables in some implementations can include offsets representing addresses to be calculated by programmable switch 112 to identify one or more additional cache lines to be obtained for a matching address.

As discussed above, the foregoing use of a centralized programmable switch to speculatively prefetch cache lines can ordinarily improve the performance of a distributed cache on a network in terms of an average number of operations that can be performed in a given timeframe. Such prefetching can allow for the use of less expensive, physically denser, and lower power SCMs in a distributed cache, as compared to DRAM or SRAM, and can compensate for latencies due to maintaining data coherency in the distributed cache.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a CPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:

1. A programmable switch, comprising:
a plurality of ports for communication with devices on a network; and
circuitry configured to:
receive program instructions to program the programmable switch for processing packets within the network, wherein the program instructions configure a data plane of the programmable switch for routing packets between a plurality of devices on the network;

receive a cache line request from a client of a plurality of clients on the network to obtain a cache line;

identify one or more additional cache lines to obtain based on the received cache line request and prefetch information received from a host in communication with the programmable switch, wherein the prefetch information is based on cache miss data previously sent to the host from the programmable switch representing cache line requests received by the programmable switch from the plurality of clients;

request the cache line and the identified one or more additional cache lines from one or more memory devices on the network via one or more ports of the plurality of ports;

receive the requested cache line and the one or more additional cache lines from the one or more memory devices; and send the requested cache line and the one or more additional cache lines to the client.

2. The programmable switch of claim 1, wherein the host provides a memory prefetch predictor for the plurality of clients.

3. The programmable switch of claim 1, wherein the circuitry is further configured to mirror packets for received cache line requests to a port of the plurality of ports to provide the host with the cache miss data.

4. The programmable switch of claim 1, wherein the circuitry is further configured to receive updated prefetch information from the host, the updated prefetch information having been prepared by the host based on the cache miss data sent from the programmable switch to the host and execution of a memory access prediction algorithm by the host.

5. The programmable switch of claim 1, wherein the client is configured to execute an internal memory access prediction algorithm for loading locally stored cache lines into a memory of the client from a storage device of the client in addition to requesting cache lines from the programmable switch.

6. The programmable switch of claim 1, wherein the programmable switch forms part of a Software Defined Networking (SDN).

7. The programmable switch of claim 1, wherein the cache line request follows a custom packet format including one or more fields indicating a memory message.

8. The programmable switch of claim 1, wherein the circuitry is further configured to:

before sending the one or more additional cache lines to the client:

store the one or more additional cache lines in a memory of the programmable switch;

send the requested cache line and one or more prefetch hints to the client indicating the one or more additional cache lines;

receive a permission request from the client in response to the one or more prefetch hints, the permission request requesting access to the one or more additional cache lines; and in response to receiving the permission request from the client, send the one or more additional cache lines stored in the memory.

9. The programmable switch of claim 1, wherein the circuitry is further configured to:

before requesting the one or more additional cache lines from the one or more memory devices:

send the requested cache line and one or more prefetch hints to the client indicating the one or more additional cache lines;

receive a permission request from the client in response to the one or more prefetch hints, the permission request requesting access to the one or more additional cache lines; and in response to receiving the permission request from the client, request the one or more additional cache lines from the one or more memory devices to send to the client.

10. The programmable switch of claim 1, wherein the circuitry is further configured to compare an address for the data requested by the cache line request to addresses stored in a match-action table to identify a matching address.

11. The programmable switch of claim 10, wherein the circuitry is further configured to calculate one or more offset addresses for the matching address to identify the one or more additional cache lines.

12. A method of providing a distributed cache, the method comprising:

receiving a cache line request from a client of a plurality of clients on a network to obtain a cache line;

identifying one or more additional cache lines to obtain based on the received cache line request and prefetch information;

requesting the cache line and the identified one or more additional cache lines from one or more memory devices on the network;

receiving the requested cache line and the one or more additional cache lines from the one or more memory devices;

sending the requested cache line and the one or more additional cache lines to the client;

sending cache miss data representing received cache line requests to a host; and receiving updated prefetch information from the host, the updated prefetch information having been prepared by the host based on the cache miss data sent to the host and execution of a memory access prediction algorithm by the host.

13. The method of claim 12, further comprising sending the cache miss data representing received cache line requests to a host by mirroring packets received for cache line requests.

14. The method of claim 12, wherein the client executes an internal memory access prediction algorithm for loading locally stored cache lines into a memory of the client from a storage device of the client in addition to requesting cache lines from the programmable switch.

15. The method of claim 12, further comprising:

before sending the one or more additional cache lines to the client:

sending the requested cache line and one or more prefetch hints to the client indicating the one or more additional cache lines;

receiving a permission request from the client in response to the one or more prefetch hints, the permission request requesting access to the one or more additional cache lines; and in response to receiving the permission request from the client, sending the one or more additional cache lines.

16. The method of claim 12, further comprising:

before requesting the one or more additional cache lines from the one or more memory devices:

sending the requested cache line and one or more prefetch hints to the client indicating the one or more additional cache lines;

receiving a permission request from the client in response to the one or more prefetch hints, the permission request requesting access to the one or more additional cache lines; and in response to receiving the permission request from the client, requesting the one or more additional cache lines from the one or more memory devices to send to the client.

17. The method of claim 12, further comprising comparing an address for the cache line requested by the cache line request to addresses stored in a match-action table to identify a matching address.

18. The method of claim 17, further comprising calculating one or more offset addresses for the matching address to identify the one or more additional cache lines.

19. A programmable switch, comprising:
a plurality of ports for communication with devices on a network; and
means for:
receiving, via a first port of the plurality of ports, a cache line request from a client of a plurality of clients on the network to obtain a cache line;
identifying one or more additional cache lines to obtain based on the received cache line request and prefetch information received from a host in communication with the programmable switch via a second port of the plurality of ports, wherein the prefetch information includes at least a portion of a match-action table generated by the host based on cache miss data previously sent to the host from the programmable switch;
requesting the cache line and the identified one or more additional cache lines from one or more memory devices on the network via one or more ports of the plurality of ports;
receiving the requested cache line and the one or more additional cache lines from the one or more memory devices; and
sending the requested cache line and the one or more additional cache lines to the client.

20. A system, comprising:
a programmable switch;
one or more memory devices configured to communicate with the programmable switch; and
a host configured to communicate with the programmable switch; and
wherein the programmable switch is configured to:
receive prefetch information from the host, wherein the prefetch information is based on cache miss data and a memory access prediction algorithm executed by the host;

receive cache line requests from one or more clients to obtain cache lines from the one or more memory devices;

send updated cache miss data to the host, the updated cache miss data representing one or more cache line requests received by the programmable switch; and identify additional cache lines to obtain for at least a portion of the received cache line requests based on the received cache line requests and the prefetch information received from the host; and wherein the host is further configured to:
receive the updated cache miss data from the programmable switch;
prepare updated prefetch information based on the received updated cache miss data using the memory access prediction algorithm; and
send the updated prefetch information to the programmable switch.

21. The system of claim 20, wherein the programmable switch is further configured to mirror packets for the one or more received cache line requests to provide the host with the updated cache miss data.

22. The system of claim 20, wherein the cache line requests follow a custom packet format including one or more fields indicating a memory message.

23. The system of claim 20, wherein the programmable switch is further configured to:
receive a cache line request from a client of the one or more clients;
identify at least one additional cache line to obtain based on the received cache line request and the prefetch information;
request the cache line and the identified at least one additional cache line from at least one memory device of the one or more memory devices;
receive the requested cache line and the at least one additional cache line from the at least one memory device; and
send the requested cache line and the at least one additional cache line to the client.

24. The system of claim 23, wherein the programmable switch is further configured to:
before sending the at least one additional cache line to the client or before requesting the at least one additional cache line from the at least one memory device, send the requested cache line and one or more prefetch hints to the client indicating the at least one additional cache line.

25. The system of claim 20, wherein the programmable switch is further configured to compare addresses for the data requested by the cache line requests to addresses stored in a match-action table to identify matching addresses.

26. The system of claim 25, wherein the programmable switch is further configured to calculate offset addresses for the matching addresses to identify the additional cache lines.

* * * * *